United States Patent Office 3,300,047
Patented Jan. 24, 1967

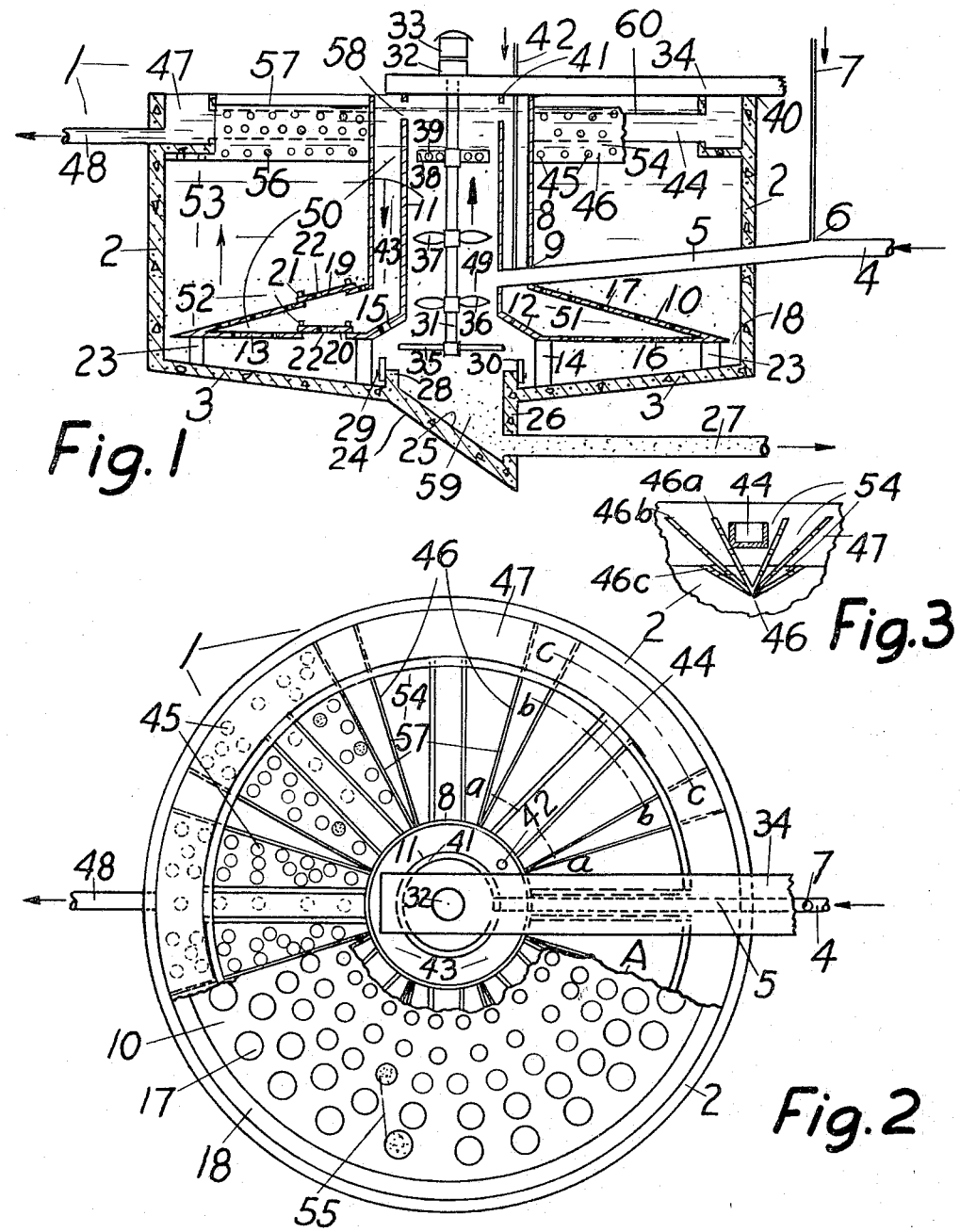

3,300,047
TRULY VERTICAL FLOW UPFLOW TANK WITH COMPLETE VOLUMETRIC TRANSIT FOR WATER AND WASTE TREATMENT
Abraham Adler Hirsch, 141 Norwood St., Shreveport, La. 71105
Filed May 5, 1966, Ser. No. 547,902
10 Claims. (Cl. 210—197)

My invention relates to improvements in upflow treatment-settling tank combinations or basins in which the incoming liquid, after treatment with coagulants or softening chemicals, passes upwardly from the bottom of the tank to collection and discharge devices at the top. At the start of its upward path the liquid usually passes through a sludge zone or blanket for purposes of filtration, solids contact or stabilization between dissolved residue and crystalline precipitates.

Upflow tanks are widely used in water treatment, particularly for softening purposes. In such cases, contact between the water and the sludge which contains reaction products, hastens completion of the softening reactions. There being an abundance of crystalline product in the sludge, equilibrium is attained during passage through the solids blanket, thereby preventing supersaturation. Although softening is the most advantageous application of upflow treatment tanks the relatively small area occupied by these units have encouraged their use also for clarification and color removal.

Despite the advantages offered by sludge contact and sludge blanket filtration all of the so-called upflow tanks to date fail to achieve both truly vertical flow and uniformly distributed flow. This is caused by the introduction of the treated liquid through a relatively small passageway toward the bottom of the tank, thereby inducing jet flow and channeling through the sludge cover, and reducing the expected time of contact between liquid and solids. These jet movements, after rising through the sludge, short circuit toward the collection weirs, not only limiting the efficiency of sedimentation, but promoting the well-known phenomenon of rising sludge.

The prime object of this invention is to provide complete and uniform volumetric displacement upward of liquid in the settling zone of a combination treatment-upflow tank. Another object is to introduce the treated liquid even throughout the whole floor area below the settling zone in order to obtain uniform distribution of flow through the sludge blanket. A further object is to provide control for pumped recirculation of the sludge for contact with the fresh incoming liquid.

In existing tanks the rising currents are obliquely upward as they spread from a concentrated inlet to a more or less distributed draw-off set of weirs or launders. This path can be visualized as a hypotenuse of a right triangle, the base of which is the radius of the floor. Considerable sluggish and dead volume exists under these conditions. Another object of this invention is to correct this fault by providing true verticality of flow. This object is attained by completely distributing the bottom inlet ports and so training the otherwise converging flow at the outlets so as to retain parallelism of flow lines.

A still further object is to arrange cooperatively the inlet and the outlet structures so as to obtain fullest benefit from the inclined orificed effluent training baffle described in Patent No. 3,221,889. This is achieved by introducing the influent to the settling compartment through a plurality of ports in the roof of a hollow distributing skirt near the bottom of the tank and collecting the ascendent cleared liquid through V-shaped orificed baffles contraposed thereto placed underneath a network of radial and concentric weirs. The holes in the bottom skirt are so located and sized as to cause a uniform upward flow of liquid throughout the sludge cover.

An additional object of this invention is to cause parallel flow lines near the effluent launders despite the fact of expanding circular cross section. This is accomplished by likewise widening the spread of the V-shaped orificed baffles underneath the radial launders as their distance is increased outward from the downdraft tube toward the peripheral wall of the tank.

Sufficient holes are open in the bottom of the hollow distribution skirt to allow passage of a portion of the slurry therethrough for purpose of recirculation and also to prevent retention and packing of the solids. Hence another object of this invention is to facilitate recycling of the sludge in contact with the influent liquid.

Still another object is to provide flexibility in choice of holes in the distribution skirt for both ascendent liquid and return sludge. This is obtained by blanking off holes as indicated by field tests to be desirable for producing a uniform flow pattern in both respective streams.

These improvements are illustrated in the drawing wherein:

FIGURE 1 is a vertical cross section of the upflow treatment-settling tank combination taken through a diameter, FIGURE 2 is a plan view of the upflow treatment-settling tank combination shown in FIGURE 1 with partial cutaway of the top members, and FIGURE 3 is a series of vertical cross sections cut through a collection trough and its corresponding inclined baffles at various distances along and beyond the run of the trough, such as sections aa, bb and cc.

Referring to each of the separate views:

FIGURE 1 shows the construction, general principles and directions of flow within the upflow treatment-settling combination tank 1. The tank as illustrated is circular in plan, having a side wall 2 and a sloping floor 3. Liquid enters through inlet pipe 4 which is sloped in its final segment 5, starting at the entry 6 of chemical feed pipe 7. This slope is to permit a feed of granular material, such as unslaked lime particles, into the inlet pipe without danger of clogging. Inlet pipe 5 passes through downdraft or down duct tube 8 at intersection 9 just above the top of spreader skirt 10 and discharges into riser tube 11.

Riser tube 11 has flared bottom tip 12 which joins a false floor 13 at the proximal edge of an inner ring of piers 14. A group of holes 15 and 16 are provided in flare 12 and false floor 13, respectively. Down duct 8 terminates at its bottom into spreader skirt 10 which likewise contains a multitude of holes or ports 17.

An annular upper sludge return space 18 is open between the tip of skirt 10 and side walls 2. Both skirt and false floor have man way plates 19 and 20, respectively, most conveniently one above the other, for purpose of entry and inspection. These are held in place by bolts or screws 21. These plates likewise contain holes 22 so as to conform to the pattern of holes in their respective placements. An outer ring of piers 23 support the overbearing structures at the juncture of false floor 13 and spreader skirt 10.

A central sump or pit 24, having a deeply sloping floor 25 and vertical front wall 26, is located at the bottom center of tank floor 3. A sludge draw off pipe, or desludger 27, connects into the bottom of pit 24. The top of pit 24, above its juncture with floor 3, is surmounted by a curb 28 to which is lag-bolted 29 a curb level adjustment ring 30.

Axially, down the center of riser tube 11, suspended on a drive shaft 31 from reduction gear box 32 and motor 33 which set on top of walkway 34, is a series of rotors consisting of a bottom agitator blade 35, a lower impeller 36 located just above the riser or updraft flare 12, an upper impeller 37, set above the point of entry of the inlet conduit 5 and a flat bladed stirrer 38 which is perforated with holes 39 to increase turbulence at this level.

Walkway 34 is supported at one end of its span by the top 40 of side wall 2 and at the other end by the top 41 of riser tube 11. A second chemical feed pipe 42 is shown extending above the walkway. It may be inserted in the tank to introduce chemical into the inlet conduit or into the annular space 43 between riser and down draft tubes. Other chemical feeders may be added at additional points as needed.

Overflow weir trough 44 collects the clear upflowing liquid after it has passed through orifices 45 in the expanding V-form orificed effluent baffle 46. The overflow is directed to the circumferential trough or launder 47 from which outlet pipe 48 drains the effluent.

The operational zones of this upflow treatment-settling tank combination consist of an inlet zone 49 in which chemically dosed influent water or liquor is mixed with sludge drawn up by impeller 36, a reaction zone 50, extending above inlet zone 49 through the remainder of the updraft tube 11, the annulus 43 in the down draft duct 8 and the flare space 51 between the spreader skirt 10 and false floor 13, a sludge separation zone 52 vertically above the spreader skirt, a quiescent settling zone 53 intermediate the sludge layer 52 and the inclined V-form orificed effluent baffle 46 and an effluent removal zone 54 thereabove.

In FIGURE 2 the circular plan of tank 1 is shown, along with the disposition of walkway 34, influent 4 and effluent 48 piping. Also more clearly indicated are two important innovations: first, the expanding reach of the V-type orificed effluent baffle 46 toward the perimeter 2 of the tank, and by cut-away A, the variation in size and complete areal distribution of ports 17 in the spreader skirt 10.

The expanding V-form effluent baffle 46 enables direct control of stream lines toward the top of the tank. Such expansion is required for its stabilizing influence to extend at greater distances from the weir troughs as the radial distance from the central structures is increased. This baffle is made to extend under the peripheral manifold 47 so that no dead volumes form at the outer wall of the tank.

The cut-away view of the spreader plate 10 illustrates by the size and frequency of the holes 17 the need for larger release area as the distance from the center of the tank increases. Some of the holes, as noted previously are plugged 55 to correct stream flow to uniform vertical currents.

Likewise, some of the holes 45 are plugged as at 56 to retain vertical parallelism in flow lines toward the upper end of the settling zone in the vicinity of the V-form effluent baffle 46.

FIGURE 3 shows sectionally the relation between the effluent collecting weir 44 and its associated V-section inclined orificed baffle 46. The sections 46a, 46b and 46c have been cut by axes aa, bb, and cc, respectively in FIGURE 2. These sections increase in spread between their top edges 57 as one advances radially outward toward the circumference of the tank. The outermost portions of the V-baffle extend underneath the circumferential manifold trough 47. Holes 45, in the baffles, some of them plugged 56 as required to maintain equal upflow toward the surface of the liquid are indicated.

The principles of operation are as follows:

Water or other liquid being treated flows into the tank 1 through inlet pipe 4. It is dosed with chemical, such as lime, on the way to the tank in order to regulate its pH or to supply reagent for the softening reaction before contacting the liquid already present. The liquor flows to the bottom portion 49 of the initial contact zone inside the central riser tube 11. Here it is thoroughly agitated in the presence of existing floc and softening product by means of the blades and impellers on shaft 31. This stirring and surface contact accelerates the reactions and stabilizes the resulting liquid with respect to calcium carbonate equilibrium.

The liquid and solids is pumped upward through the riser tube and passes through ports 58 into the annulus 43 inside the drowndraft duct 8. Here the contact between liquid and solids continues, carrying the reactions forward. Somewhere along the path in the downduct additional chemical is introduced, such as a coagulant through a means such as pipe 42, to aid in later separation of solid from liquid phases and increase clarification. The chemical may have been added even at the top of the riser tube where agitation is still vigorous.

The treated liquid and suspended solids load then flows into the horn shaped dispensing section or flare space 51 where some flows through the bottom plate orifices 16 to be drawn up again by the suction of impeller 36 into the recycling stream, and the remainder rises upward through orifices 17 in the spreader skirt into the sludge separation zone 52.

Some of the sludge for the recycling slurry settles into the central sump 24 from whence it is periodically drawn off through desludging pipe 27. The curbs 30 allow the depth of sludge draw off zone 59 to be varied according to needs.

Some of the holes 16 and 17 in false floor and spreader plate, respectively, are plugged according to the volume of liquid desired for recirculation and for the purpose of equally distributing upflowing liquid through the sludge separation zone 52.

The liquid rising through the sludge blanket is now clear, having separated its burden of suspended solids as it percolated therethrough. The clear liquid rises to the expanding V-form orificed effluent baffles or guides 46 and passes through the orifices therein to overflow at the crest 60 of the radial effluent weirs 44. The liquid then advances to a circumferential trough 47 from which it is drained by outlet pipe 48.

Some of the orifices in the inclined V-type effluent baffle are plugged as at 50 to adjust the upflow in settling zone 53 to a condition of uniformity throughout the tank. This adjustment is accomplished in the field by direct observation and test measurements.

The combination of completely distributed bottom spreader plate orifices and similarly completely distributed effluent guide baffle orifices enable the upflow in the basin to be practically uniform, without short circuits, eddies or dead volumes. This is the first upflow basin ever designed which achieves relatively perfect piston type advance of the liquid. Its action is accomplished by spreading and controlling the distribution of the uprising stream at both inlet and outlet.

This double control is superior to regulations at the outlet only, as in Patent No. 3,221,889, since it permits dual manipulation to guarantee truly vertical linear vertical upflow. An outlet baffle alone would partially correct inlet deficiencies only at lower rates of flow at which much of the capacity of the tank as described would remain unutilized.

This structure is a truly vertical upflow basin with an altitude type of flow. All of its predecessors have a hypotenuse type of flow, which is a mixture of vertical and horizontal components, with some degree of eddying. With uniformity possible in flow regime, as with instant tank, the effluent will be clearer and more stable with respect to chemical equilibria involved than in preceding so-called upflow tanks.

Within the confines of the V-shaped effluent baffle such turbulence and eddying that develop thereafter are immaterial since the liquid has already left the quiescent settling zone once it has passed through an orifice 45.

Other than circular tanks come under the scope of this description. However, the circular plan is a preferred construction on account of its simplicity, symmetry and economy of wall material required for a given volumetric content. The same principles as recited apply to any outline of tank, and the scope of the claims is intended to embrace such variations.

Also radial type weirs or launders are shown in the drawing, but a concentric arrangement or a combination concentric and radial coverage by launders would suffice as well provided the orificed effluent baffle was suitably installed therewith. From a standpoint of construction the radial configuration is preferable as it avoids the necessity for columnar support. Nevertheless, the scope of this application contemplates all types of weir or launder draw off distributions and the claims are cast accordingly.

I claim:

1. An upflow treatment-settling tank combination for water or other liquids arranged for truly vertical currents within its settling zone and uniform distribution of stream lines over the entire cross section thereof comprising an outside wall, a sloping floor, a sump at the center of said floor, curbs on the top of said sump, a desludging pipe connected to the bottom of said sump, a central riser tube which receives influent near its bottom, agitators and impellers suspended in said riser tube on a drive shaft, a flare at the bottom of said riser, ports near the top of said riser tube for passage of the mixture of the liquid and recirculated slurry into an annular space between said riser and a downdraft duct surrounding the riser tube, an outwardly sloping skirt at the bottom of said downdraft duct and extending to near the periphery of said tank, distributing means in said sloping skirt for equalizing the upflow of liquid into a sludge release zone immediately thereabove, a false floor underneath said sloping skirt extending to said flare of said riser tube, selective means in said false floor to regulate relative amounts of liquid-slurry mixture passing through said sloping skirt and said false floor for recirculation, piers under the intersection of said skirt with said false floor for support, piers under the intersection of said false floor with said flare of said riser for support thereof, removable manways in said skirt and said false floor for purpose of inspection, means to collect clear effluent at the top of said tank, inclined V-shaped orificed effluent baffle means under said effluent collection means to train currents within said settling zone and a circumferential manifold to gather effluent from said effluent collection means and drain the same through an effluent conduit.

2. A truly upflow treatment-settling tank combination for water or other liquids as in claim 1 in which said distributing means for equalizing the upflow of liquid through said sludge release zone and said settling zone is in direct vertical contraposition to said V-shaped inclined orificed effluent baffle means, said distributing means and said baffle means extending over substantially the whole horizontal area of said tank.

3. Claim 1 in which the distributing means in said sloping skirt includes holes spread over the surface thereof, some of said holes being plugged to regulate flow therethrough in order to attain uniformity of vertical flow throughout said settling zone.

4. Claim 3 in which said holes in said skirt are arranged in a series of different sizes, said sizes varying with the radial distance from said downdraft duct.

5. Claim 1 in which said outwardly sloping skirt of said downdraft duct is spaced from the peripheral wall of said tank sufficiently to permit a relatively large flow of slurry from said sludge zone toward said sloping floor from whence said impellers in said riser tube return said slurry into recirculation.

6. Claim 1 in which the selective means for flow control through said false floor consists of holes over the surface thereof, some of said holes being plugged to obtain a desired ratio of volume of sludge through the orifices in said sloping skirt and through said false floor.

7. Claim 6 in which said holes in said false floor vary in size with their radial distance from the center of said tank.

8. Claim 1 in which the means to collect clear effluent is a system of radial weirs.

9. Claim 1 in which the effluent collection means includes troughs in communication with the circumferential manifold, the side walls of said V-shaped baffle means widening outwardly in the radial direction from said downdraft duct towards the circumferential manifold.

10. Claim 9 in which the tops of said V-shaped baffle means located between said circumferential manifold and said downdraft duct lie in a plane slightly above the tops of said troughs, and the tops of said V-shaped baffle means located underneath said circumferential manifold contact the ceiling so-formed therewith.

No references cited.

REUBEN FRIEDMAN, *Primary Examiner.*

J. DE CESARE, *Assistant Examiner.*